D. R. HANAWALT.
COLLAPSIBLE CORE.
APPLICATION FILED NOV. 25, 1914.
1,164,345. Patented Dec. 14, 1915.
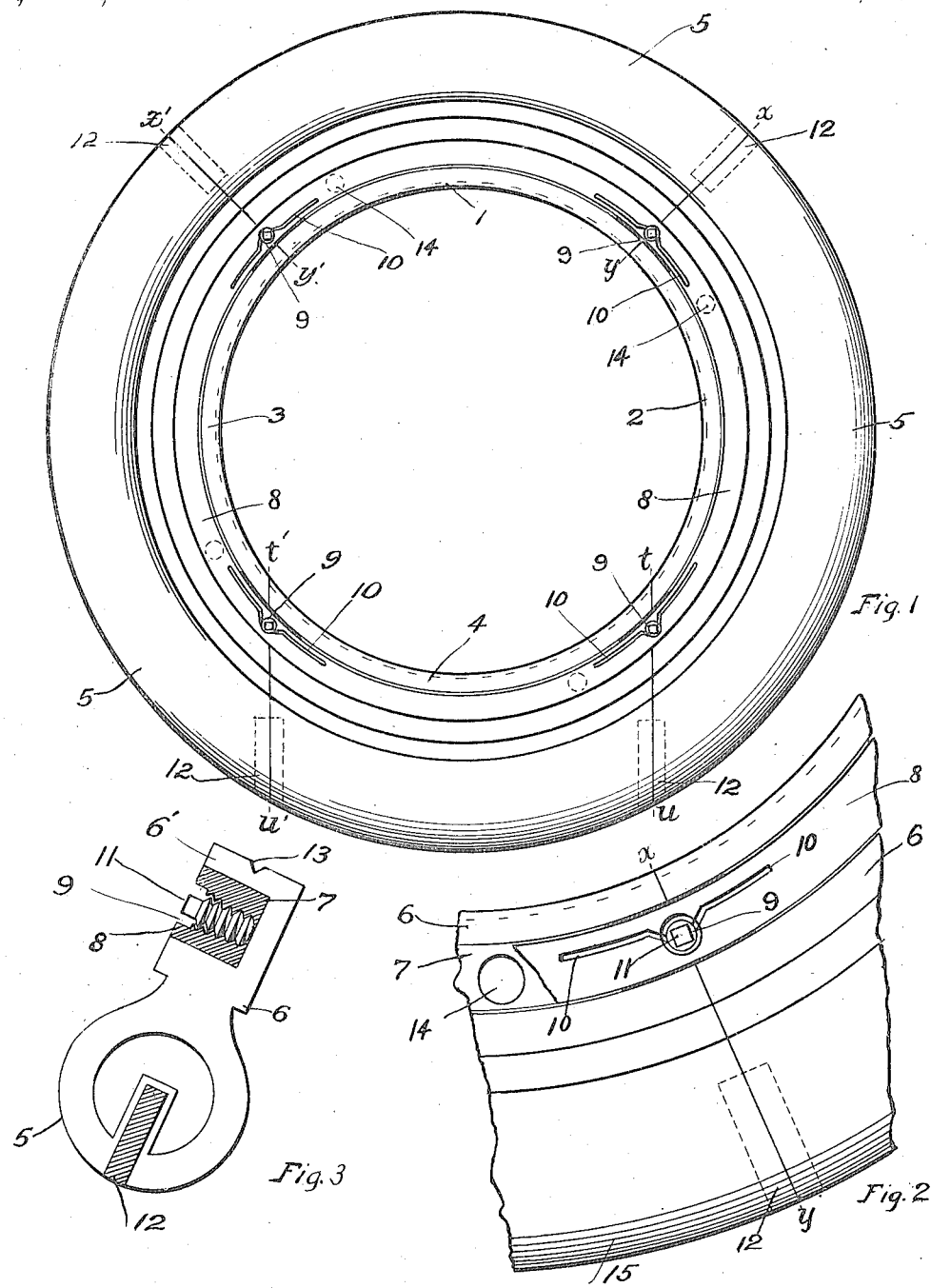
WITNESSES:
O. M. Morningstar
L. S. Rizer
INVENTOR,
Daniel R. Hanawalt
per D. B. Replogle
Atty.

UNITED STATES PATENT OFFICE.

DANIEL R. HANAWALT, OF AKRON, OHIO, ASSIGNOR OF ONE-HALF TO M. D. KUHLKE, OF AKRON, OHIO.

COLLAPSIBLE CORE.

1,164,345.  Specification of Letters Patent.  Patented Dec. 14, 1915.

Application filed November 25, 1914.  Serial No. 874,040.

*To all whom it may concern:*

Be it known that I, DANIEL R. HANAWALT, a citizen of the United States, residing at 257 West North street, in the city of Akron, county of Summit, and State of Ohio, have invented certain new and useful Improvements in Collapsible Cores for the Manufacture of Automobile-Tires, of which the following is a specification.

This invention relates to new and useful improvements in collapsible cores or mandrels designed particularly for use in molding rubber tires or similar articles.

The objects of the invention are to provide simplified means for assembling the parts of such cores, more effectively snugging the joints of the several parts thereof when in position, facilitating the means for disassembling and removing said core, and presenting in general a neater exterior than is general with such cores, and other objects as will appear in the specification and claims.

To these ends the invention consists of the construction, arrangement and combination of parts as set forth, and illustrated in the accompanying drawing.

Referring to the drawing, Figure 1 is a view in elevation of an assembled core embodying my invention. Fig. 2 is an enlarged detailed view showing more particularly the means for snugging the joints of the sections. Fig. 3 is a view in cross section taken on the line $xy$ of Fig. 2.

Similar characters of reference denote like and corresponding parts in the several views.

Referring to the drawing the core for the most part is made up of sections or members 1, 2, 3 and 4 preferably constructed from hollow or tubular cast iron; and will be most conveniently constructed by first casting and machining as a whole then sawing into sections on the radial lines $xy$, and $x'$ $y'$ and on the parallel lines $tu$ and $t'$ $u'$, then adding a thickness of material to compensate for the saw cut, on an end of each of said sections. Any other convenient number of sections than four might be used, but in any case one of the sections should be constructed so that its ends are either parallel or outwardly converging so that it may be first withdrawn from the molded casing or shoe during operation, as for example section 4 in Fig. 1.

The main part of the core consists of an annular portion 5, which is of a cross section to correspond with the inner part of the tire to be molded. Integrally constructed therewith is an inwardly extending flange 6 which is provided with an annular groove 7 in which fits a ring 8 which ring is furnished with threaded holes, 9, 9, etc., into which is adapted to be driven, plugs 11, 11, etc. Extending circumferentially from either side of the holes 9, 9, etc., are saw cuts 10, 10, etc. These saw cuts are cut nearer the inner edge of the ring 8 than to the outer edge, but they must be so curved as to divide the holes 9, 9, etc., through their centers, so that when the plugs 11, 11, etc., are driven into said holes the parts of the inner periphery of said ring contiguous to said saw cuts are pressed tightly against the inner lip 6' in the vicinity of the joints of the said sections 1, 2, 3 and 4; by which means the joints are made snug, the sections solidly held together, and the ring 8 firmly anchored within the groove 7. To further assist in the alinement of the sections, keys 12, 12, etc., are inserted at the junctions of the sections where the faces of the annular portion 5 abut.

In the operation of the device the sections are laid together so as to complete the core form and the ring 8 inserted in the groove 7 in such manner that a plug 11 will occur in the vicinity of each joint. The keys 12, 12, etc., are then arranged to hold the core in lateral alinement after which the parts are brought into perfect concentric alinement by driving plugs 11, 11, etc., into said holes 9, 9, etc., thus splitting or thickening the ring 8 to such an extent as to impinge on both concentric sides of the groove 7 locking and holding all of the parts in secure and perfect alinement.

The core may then be mounted on the usual spider, for which purpose an annular V shaped groove 13 is arranged on the inner flange of the complete core.

After the mold has served its purpose in the usual manner it is disassembled by removing the plugs 11, 11, etc., removing the ring 8 from the groove 7, and then sliding the section 4 inwardly withdrawing it from the molded form leaving the keys 12, 12, etc. of said section remaining in that part of their sockets which are connected to their sections 2 and 3, respectively. After removing section 4 it is apparent the other sections will readily collapse and be easily removed from the tire formed and all the parts are ready for further duty. Should the ring 8 be inclined to stick within the groove 7 it may be driven out by means of a punch or other tool applied through holes 14, 14, etc., from the rear side of the groove 7.

While the form and style of core described and shown in the drawings embodies what I believe to be the preferable construction, it is to be understood that the proportions of the parts, the sizes thereof and also many details may be greatly varied without departing from the general spirit of the invention. For example, the groove 7 might be cut slightly wider at its bottom portion so as more securely to anchor the ring 8 therein, and the holes 9, 9, etc., might be bored without threads and tapering, and be adapted to receive plain tapering plugs instead of plugs 11, 11, etc.

Having thus described my invention and the operation thereof, what I desire to secure by Letters Patent is:—

1. A collapsible core comprised in an annular body formed from abutting sections, abutting faces on said sections, means on said faces for effecting lateral alinement, inwardly extending annular flanges on said sections, an annular groove in the flanges, a ring fitting into said groove, a lip of said groove coincident with the inner side of said ring, holes in said ring, circumferential slits extending from said holes and means for widening the ring at said slits for the purpose set forth.

2. A collapsible core consisting of assembled abutting sections forming an annular body, abutting faces on said sections, said abutting faces of said sections being provided with means to effect lateral alinement, grooved flanges on said sections forming when assembled an annular concentric groove, a ring adapted to fit into said groove and means for expanding the width of said ring so as to spread it and draw the sections aforesaid into snug concentric alinement.

3. A collapsible core of the kind described comprised in a plurality of segments making an annular body, the ends of said segments having abutting faces, keys in said faces adapted to aline said segments laterally, an annular inwardly extending flange having an annular groove extending continuously around an inner circle of the whole when assembled, a ring adapted to fit into said groove and to aline said segments concentrically, holes in said ring coinciding in position with the planes of abutting faces of the segments, slits extending circumferentially from said holes and plugs adapted to be driven into said holes so as to spread the sides of said ring for the purpose of snugging segmental joints.

DANIEL R. HANAWALT.

Witnesses:
H. E. BOARDMAN,
A. C. HOLLOWAY.